United States Patent
Ogawa et al.

(10) Patent No.: US 12,092,099 B2
(45) Date of Patent: Sep. 17, 2024

(54) LIQUID FEEDING DEVICE

(71) Applicant: SHIMADZU CORPORATION, Kyoto (JP)

(72) Inventors: Keisuke Ogawa, Kyoto (JP); Shinya Imamura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 10 days.

(21) Appl. No.: 16/612,380

(22) PCT Filed: Jul. 3, 2017

(86) PCT No.: PCT/JP2017/024291
§ 371 (c)(1),
(2) Date: Nov. 9, 2019

(87) PCT Pub. No.: WO2019/008617
PCT Pub. Date: Jan. 10, 2019

(65) Prior Publication Data
US 2021/0156376 A1     May 27, 2021

(51) Int. Cl.
*F04B 51/00*     (2006.01)
*F04B 1/16*      (2006.01)
(Continued)

(52) U.S. Cl.
CPC ............... *F04B 51/00* (2013.01); *F04B 1/16* (2013.01); *F04B 13/00* (2013.01); *F04B 49/24* (2013.01);
(Continued)

(58) Field of Classification Search
CPC .......... F04B 1/16; F04B 13/00; F04B 49/065; F04B 49/24; F04B 53/10;
(Continued)

(56) References Cited

U.S. PATENT DOCUMENTS 5,637,208 A     6/1997  Dourdeville
6,923,916 B1 *  8/2005  Hiraku ............... F04B 11/0083
                                                  210/101
(Continued)

FOREIGN PATENT DOCUMENTS

JP      H07-133894 A     5/1995
WO      2017/094097 A1   6/2017

OTHER PUBLICATIONS

Office Action for corresponding Chinese Patent Application No. 201780090748.7 dated Jul. 3, 2020, with English language translation.
(Continued)

*Primary Examiner* — Philip E Stimpert
(74) *Attorney, Agent, or Firm* — Renner, Otto, Boisselle & Sklar, LLP (57) ABSTRACT

A liquid feeding device includes a primary plunger pump; a secondary plunger pump connected downstream; a check valve provided between the primary plunger pump and the secondary plunger pump; a primary pressure sensor that detects a pressure in the pump chamber of the primary plunger pump; a liquid feeding control part configured to control operations of the primary plunger pump and the secondary plunger pump; and a liquid leakage detector configured to detect liquid leakage in the check valve based on a change in an output value of the primary pressure sensor during the waiting time. The liquid feeding control part is configured to control the operation of the primary plunger pump so that a waiting time, where the primary plunger pump stops without operating, is present while a discharge operation by the secondary plunger pump is performed after a suction by the primary plunger pump is completed.

6 Claims, 4 Drawing Sheets (51) Int. Cl.
*F04B 13/00* (2006.01)
*F04B 49/24* (2006.01)
*F04B 53/10* (2006.01)

(52) U.S. Cl.
CPC ...... *F04B 53/10* (2013.01); *F04B 2201/0605* (2013.01)

(58) Field of Classification Search
CPC ...... F04B 2201/0405; F04B 2201/0605; F04B 23/06; F04B 11/0075
See application file for complete search history.

(56) References Cited

U.S. PATENT DOCUMENTS

| | | | | |
|---|---|---|---|---|
| 7,578,173 | B2* | 8/2009 | Weissgerber | G05D 11/132 73/61.56 |
| 7,631,542 | B2* | 12/2009 | Weissgerber | G05D 11/132 73/61.56 |
| 7,992,429 | B2* | 8/2011 | Weissgerber | G01N 30/36 73/61.56 |
| 9,624,923 | B2* | 4/2017 | Ruegenberg | G01N 30/32 |
| 2006/0288803 | A1* | 12/2006 | Weissgerber | G01N 30/36 73/865.8 |
| 2007/0000312 | A1* | 1/2007 | Weissgerber | G01N 30/36 700/282 |
| 2007/0000313 | A1* | 1/2007 | Weissgerber | G05D 11/132 700/282 |
| 2011/0259451 | A1* | 10/2011 | Weissgerber | G01N 30/36 73/40.5 R |
| 2014/0161627 | A1* | 6/2014 | Sivaramakrishnan | F04B 9/113 417/2 |
| 2015/0285239 | A1* | 10/2015 | Shoykhet | F04B 49/08 417/63 |
| 2017/0030281 | A1* | 2/2017 | Willis | F02D 41/22 |
| 2018/0245581 | A1 | 8/2018 | Imamura | |

OTHER PUBLICATIONS

Office Action for corresponding Japanese Patent Application No. 2019-528186 dated Jul. 14, 2020, with English language translation.
International Search Report for corresponding International Application No. PCT/JP2017/024291, mailed Aug. 15, 2017.
Written Opinion for corresponding International Application No. PCT/JP2017/024291, mailed Aug. 15, 2017.

* cited by examiner

LIQUID FEEDING DEVICE

TECHNICAL FIELD

The present invention relates to a double plunger type liquid feeding device used for liquid feeding a mobile phase in a liquid chromatograph, and in particular, an in-line double plunger type liquid feeding device in which a primary plunger pump and a secondary plunger pump are connected in series.

BACKGROUND ART

As one of liquid chromatograph liquid feeding devices, an in-line double plunger type liquid feeding device is known. The in-line double plunger type liquid feeding device includes a primary plunger pump and a secondary plunger pump connected in series with the primary plunger pump. The primary plunger pump and the secondary plunger pump operate complementarily to each other so that liquid feeding is stably performed at a preset flow rate (see, for example, Patent Document 1).

While the primary plunger pump is performing the discharge operation, the secondary plunger pump performs the suction operation, and the secondary plunger pump sucks part of the liquid discharged by the primary plunger pump. When the discharge operation of the primary plunger pump is completed, the secondary plunger pump performs the discharge operation, and during this time, the primary plunger pump sucks the liquid.

PRIOR ART DOCUMENT

Patent Document

Patent Document 1: U.S. Pat. No. 5,637,208

SUMMARY OF THE INVENTION

Problems to be Solved by the Invention

In the in-line double plunger type liquid feeding device as described above, a check valve is provided between the outlet of the primary plunger pump and the inlet of the secondary plunger pump, and the check valve prevents the liquid from flowing back to the primary plunger pump when the secondary plunger pump performs the discharge operation.

However, the liquid tightness between the valve body and the valve seat of the check valve may deteriorate, and liquid leakage may occur. When liquid leakage occurs at the check valve between the outlet of the primary plunger pump and the inlet of the secondary plunger pump, part of the liquid discharged by the secondary plunger pump flows to the primary plunger pump side, and the liquid feeding flow rate during the discharging process by the secondary plunger pump does not reach the set flow rate, so that the liquid feeding at a constant flow rate cannot be realized, and pulsation occurs, leading to deterioration in reproducibility of holding time of analysis.

Conventionally, there has been no means that detects a backflow from the secondary plunger pump to the primary plunger pump. Therefore, it is difficult to take an appropriate measure when the control accuracy of the liquid feeding flow rate is lowered.

Therefore, an object of the present invention is to make it possible to detect liquid leakage at a check valve between a primary plunger pump and a secondary plunger pump.

Solutions to the Problems

A liquid feeding device according to the present invention includes a primary plunger pump, a secondary plunger pump connected to downstream of the primary plunger pump in series, a check valve provided between an outlet of the primary plunger pump and an inlet of the secondary plunger pump, a primary pressure sensor that communicates with a pump chamber of the primary plunger pump and that detects a pressure in the pump chamber of the primary plunger pump, a liquid feeding control part configured to control operations of the primary plunger pump and the secondary plunger pump, the liquid feeding control part being configured to control the operation of the primary plunger pump so that a waiting time, where the primary plunger pump stops without operating, is present while a discharge operation by the secondary plunger pump is performed after a suction by the primary plunger pump is completed, and a liquid leakage detector configured to detect liquid leakage in the check valve based on a change in an output value of the primary pressure sensor during the waiting time.

In the liquid feeding device of the present invention, a primary pressure sensor that detects the pressure in the pump chamber of the primary plunger pump is provided. The primary plunger pump is configured to suck the liquid after the discharge operation of the primary plunger pump is completed and the discharge by the secondary plunger pump is started, and then stops without operating for a certain period of time. The time for which the primary plunger pump stops after completing suction is referred to as a "waiting time".

The pressure in the pump chamber of the primary plunger pump after the primary plunger pump has suctioned the liquid is normally atmospheric pressure. Accordingly, the atmospheric pressure is maintained during the "waiting time" during which the operation of the primary plunger pump is stopped. However, when liquid leakage occurs at the check valve between the primary plunger pump and the secondary plunger pump, the liquid flowing backward from the secondary plunger pump flows into the pump chamber of the primary plunger pump, and the pressure in the pump chamber of the primary plunger pump increases. Thereby, the output value of the primary pressure sensor rises.

That is, by monitoring the output value of the primary pressure sensor during the waiting time, it is possible to detect liquid leakage at the check valve between the primary plunger pump and the secondary plunger pump. Therefore, the liquid leakage detector monitors the output value of the primary pressure sensor during the waiting time, and detects the liquid leak based on the change in the output value.

Furthermore, the pressure in the pump chamber of the primary plunger pump during the "waiting time" when the operation of the primary plunger pump is stopped rises in proportion to the amount of liquid flowing backward from the secondary plunger pump and flowing into the pump chamber of the primary plunger pump. From this, it is possible to calculate the backflow amount of liquid to the primary plunger pump, that is, the amount of liquid leakage in the check valve, based on the increasing rate in the output value of the primary pressure sensor.

Therefore, in a further preferred embodiment of the liquid feeding device according to the present invention, the liquid feeding device further includes a relational expression holding part that holds a relational expression indicating a relationship between an increasing rate in the output value of the primary pressure sensor and an amount of liquid leakage per part time in the check valve, wherein the liquid leakage detector is configured to calculate the amount of liquid leakage per part time in the check valve based on the increasing rate in the output value of the primary pressure sensor during the waiting time when the primary plunger pump is stopped and the relational expression held in the relational expression holding part.

The relationship between the increasing rate in the output value of the primary pressure sensor and the amount of liquid leakage in the check valve may be obtained in advance by experiments. However, the relationship between the increasing rate in the output value of the pressure sensor of the primary pressure sensor and the amount of liquid leakage in the check valve varies depending on the compressibility of the liquid, and the compressibility of the liquid varies with temperature and the like.

Therefore, in order to obtain a more accurate relational expression, the liquid feeding device may have a function of deriving such a relational expression. In order to derive the relational expression, the pre-pressure operation of the primary plunger pump can be used. The "pre-pressure operation" here is to cause the primary plunger pump to perform a discharge operation until the pressure in the pump chamber of the primary plunger pump becomes substantially the same as the pressure in the pump chamber of the secondary plunger pump during the discharge operation by the secondary plunger pump after the waiting time has elapsed. The fact that the pressure in the pump chamber of the primary plunger pump is "substantially the same" as the pressure in the pump chamber of the secondary plunger pump includes the fact that in addition to the pressure in the pump chamber of the primary plunger pump being exactly the same as the pressure in the pump chamber of the secondary plunger pump, the pressure in the pump chamber of the primary plunger pump is slightly lower than the pressure in the pump chamber of the secondary plunger pump.

It should be noted that the above relational expression can be derived during this pre-pressure operation only when no liquid leakage occurs at the check valve between the primary plunger pump and the secondary plunger pump. This is because when there is a leak at the check valve between the primary plunger pump and the secondary plunger pump, since the pressure in the pump chamber of the primary plunger pump reaches the same level as the pressure in the pump chamber of the secondary plunger pump during the "waiting time" before the pre-pressure operation, the pre-pressure operation ends without performing the discharge operation by the primary plunger pump.

Therefore, in a further preferred embodiment of the liquid feeding device according to the present invention, the liquid feeding device further includes a secondary pressure sensor that communicates with a pump chamber of the secondary plunger pump and detects a pressure in the pump chamber of the secondary plunger pump, a pre-pressure operation part configured to perform a pre-pressure operation in which a discharge operation of the primary plunger pump is performed until an output value of the primary pressure sensor reaches a value substantially the same as an output value of the secondary pressure sensor while a discharge operation by the secondary plunger pump is performed and after the waiting time has elapsed, and a relational expression deriving part configured to obtain the relational expression based on a driving amount of a plunger of the primary plunger pump and the increasing rate in the output of the primary pressure sensor while the pre-pressure operation is performed. The relational expression holding part holds the relational expression derived by the relational expression deriving part.

In a further preferred embodiment, when liquid leakage is detected in the check valve by the liquid leakage detector, the liquid feeding control part is configured to compensate for a loss of a liquid feeding flow rate due to the liquid leakage by increasing a discharge speed of the secondary plunger pump based on an amount of the liquid leakage calculated by the liquid leakage detector. "Compensate for loss of liquid feeding flow rate due to liquid leakage" means to make the liquid feeding flow rate the set flow rate by increasing the discharge speed of the secondary plunger pump in consideration of the amount of liquid leakage. For example, when the set flow rate is $\alpha$ µL/min and the calculated amount of liquid leakage is $\beta$ µL/min, the discharge speed of the secondary plunger pump is controlled so that the discharge flow rate from the secondary plunger pump is $(\alpha+\beta)$ µL/min. In this way, by compensating for the loss of the liquid feeding flow rate due to liquid leakage by the discharge speed of the secondary plunger pump, a decrease in the liquid feeding flow rate in the discharge process of the secondary plunger pump can be suppressed even when a liquid leak occurs at the check valve between the outlet of the primary plunger pump and the inlet of the secondary plunger pump, so that it is possible to suppress the occurrence of pulsation and stabilize the liquid feeding flow rate.

Effects of the Invention

In the liquid feeding device according to the present invention, a liquid leakage in the check valve is detected based on the change in the output value of the primary pressure sensor when the primary plunger pump stops, and the secondary plunger pump is performing a discharge operation, so that a liquid leakage in the check valve provided between the outlet of the primary plunger pump and the inlet of the secondary plunger pump can be detected quickly. When the liquid leakage at the check valve can be detected, accordingly, the discharge speed of the secondary plunger pump can be increased to suppress the decrease in the liquid supply flow rate, so that it is possible to stabilize liquid feeding flow rate.

EMBODIMENT OF THE INVENTION

Hereinafter, an embodiment of a liquid feeding device according to the present invention will be described with reference to the drawings.

Figure 1:
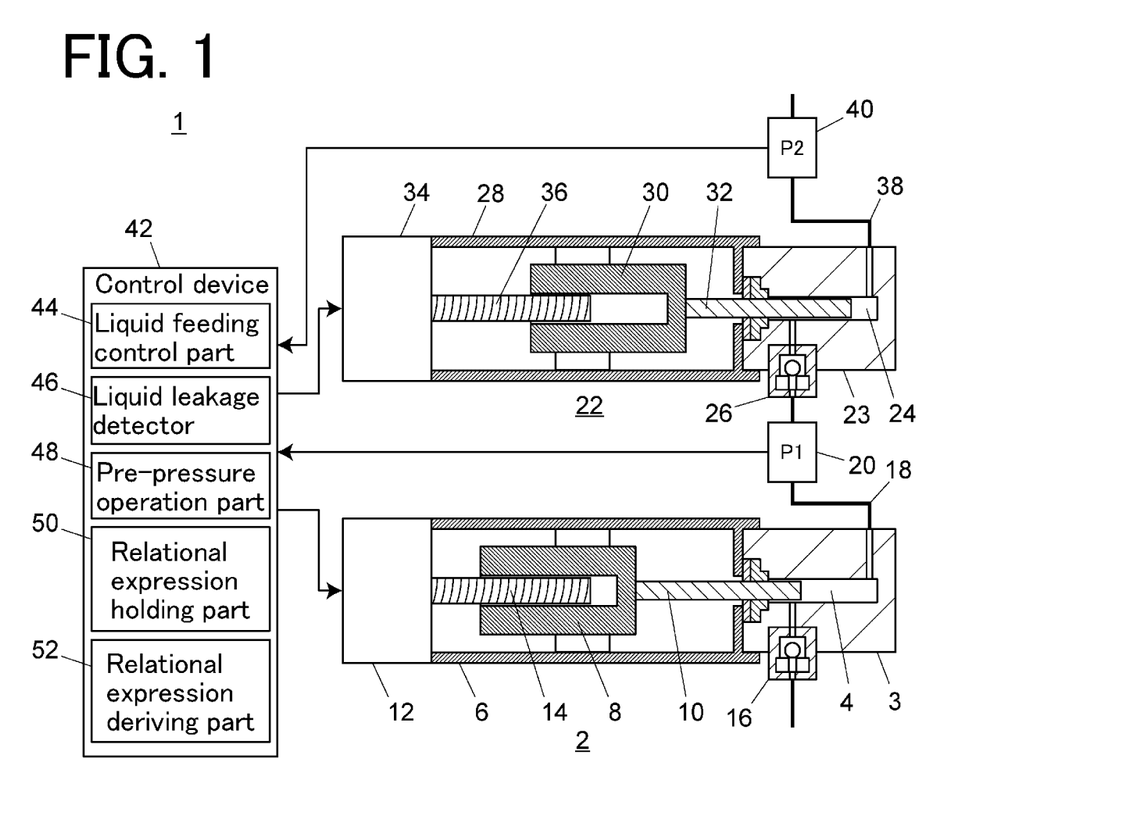
FIG. 1 is a schematic sectional view showing an embodiment of a liquid feeding device.

First, the configuration of the liquid feeding device will be described with reference to FIG. 1.

A liquid feeding device 1 of the embodiment includes a primary plunger pump 2 and a secondary plunger pump 22. The primary plunger pump 2 and the secondary plunger pump 22 are connected in series with each other.

The primary plunger pump 2 includes a pump head 3 having a pump chamber 4 therein, and a pump body 6. The pump head 3 is provided at the distal end of the pump body 6. The pump head 3 is provided with an inlet portion for flowing the liquid into the pump chamber 4 and an outlet portion for flowing the liquid out of the pump chamber 4. A check valve 16 is provided at the inlet portion of the pump head 3 to prevent a backflow of liquid.

The distal end of a plunger 10 is slidably inserted into the pump chamber 4. The proximal end of the plunger 10 is held by a crosshead 8 accommodated in the pump body 6. The crosshead 8 moves in one direction (left-right direction in the figure) in the pump body 6 by the rotation of a lead screw 14, and the plunger 10 moves in the one direction accordingly. A primary plunger pump drive motor 12 for rotating the lead screw 14 is provided at the proximal end portion of the pump body 6. The primary plunger pump drive motor 12 is a stepping motor.

The secondary plunger pump 22 includes a pump head 23 having a pump chamber 24 therein and a pump body 28. The pump head 23 is provided at the distal end of the pump body 28. The pump head 23 is provided with an inlet portion for flowing the liquid into the pump chamber 24 and an outlet portion for flowing the liquid out of the pump chamber 24. A check valve 26 is provided at the inlet portion of the pump head 23 to prevent a backflow of liquid.

The distal end of a plunger 32 is slidably inserted into the pump chamber 24. The proximal end of the plunger 32 is held by a crosshead 30 accommodated in the pump body 28. The crosshead 30 moves in one direction (left-right direction in the figure) in the pump body 28 by the rotation of a lead screw 36, and the plunger 32 moves in the one direction accordingly. A secondary plunger pump drive motor 34 for rotating the lead screw 36 is provided at the proximal end portion of the pump body 28. The secondary plunger pump drive motor 34 is a stepping motor.

The inlet portion of the pump head 3 is connected to a container (not shown) for storing a liquid to be fed via a flow path. The inlet portion of the pump head 23 is connected to the outlet portion of the pump head 3 via a connection flow path 18. A primary pressure sensor 20 that detects the pressure (P1) in the pump chamber 4 is provided on the connection flow path 18.

An outlet flow path 38 is connected to the outlet portion of the pump head 23. The outlet flow path 38 communicates with, for example, an analysis flow path of a liquid chromatograph. A secondary pressure sensor 40 that detects the pressure (P2) in the pump chamber 24 is provided on the outlet flow path 38.

Operations of the primary plunger pump drive motor 12 and the secondary plunger pump drive motor 34 are controlled by a control part 42. The control part 42 includes a liquid feeding control part 44, a liquid leakage detector 46, a pre-pressure operation part 48, a relational expression holding part 50, and a relational expression deriving part 52. The control device 42 is realized by a dedicated computer or a general-purpose personal computer. The liquid feeding control part 44, the liquid leakage detector 46, the pre-pressure operation part 48, and the relational expression deriving part 52 are functions obtained by an arithmetic element such as a CPU provided in the control device 42 executing a predetermined program. The relational expression holding part 50 is a function realized by a partial storage area of a storage device provided in the control device 42.

The liquid feeding control part 44 is configured to control the operation of the primary plunger pump 2 and the secondary plunger pump 22 so that the primary plunger pump 2 and the secondary plunger pump 22 operate in a complementary manner to perform the liquid feeding at a preset flow rate.

The liquid leakage detector 46 is configured to detect a liquid leakage in the check valve 26 and calculates the amount of the liquid leakage based on the output value of the primary pressure sensor 20 during the time in which the secondary plunger pump 22 performs a discharge operation and the "waiting time" during which the primary plunger pump 2 is stopped. The calculation of the "waiting time" and the amount of liquid leakage will be described later.

The pre-pressure operation part 48 is configured to cause the primary plunger pump 2 to perform a pre-pressure operation described later while the secondary plunger pump 22 performs the discharge operation and after the "waiting time" has elapsed.

The relational expression holding part 50 holds a relational expression for the liquid leakage detector 46 to calculate the amount of liquid leakage in the check valve 26 based on the output value of the primary pressure sensor 20. The relational expression held in the relational expression holding part 50 is an expression indicating the relationship between the increase value (increase rate) of the output value of the primary pressure sensor 20 per part time and the amount of liquid leakage per part time in the check valve 26. This relational expression may be obtained in advance by experiments, or may be derived by the relational expression deriving part 52 described later.

The relational expression deriving part 52 is configured to derive the above relational expression during the pre-pressure operation of the primary plunger pump 2. A specific derivation method will be described later.

Figure 2:
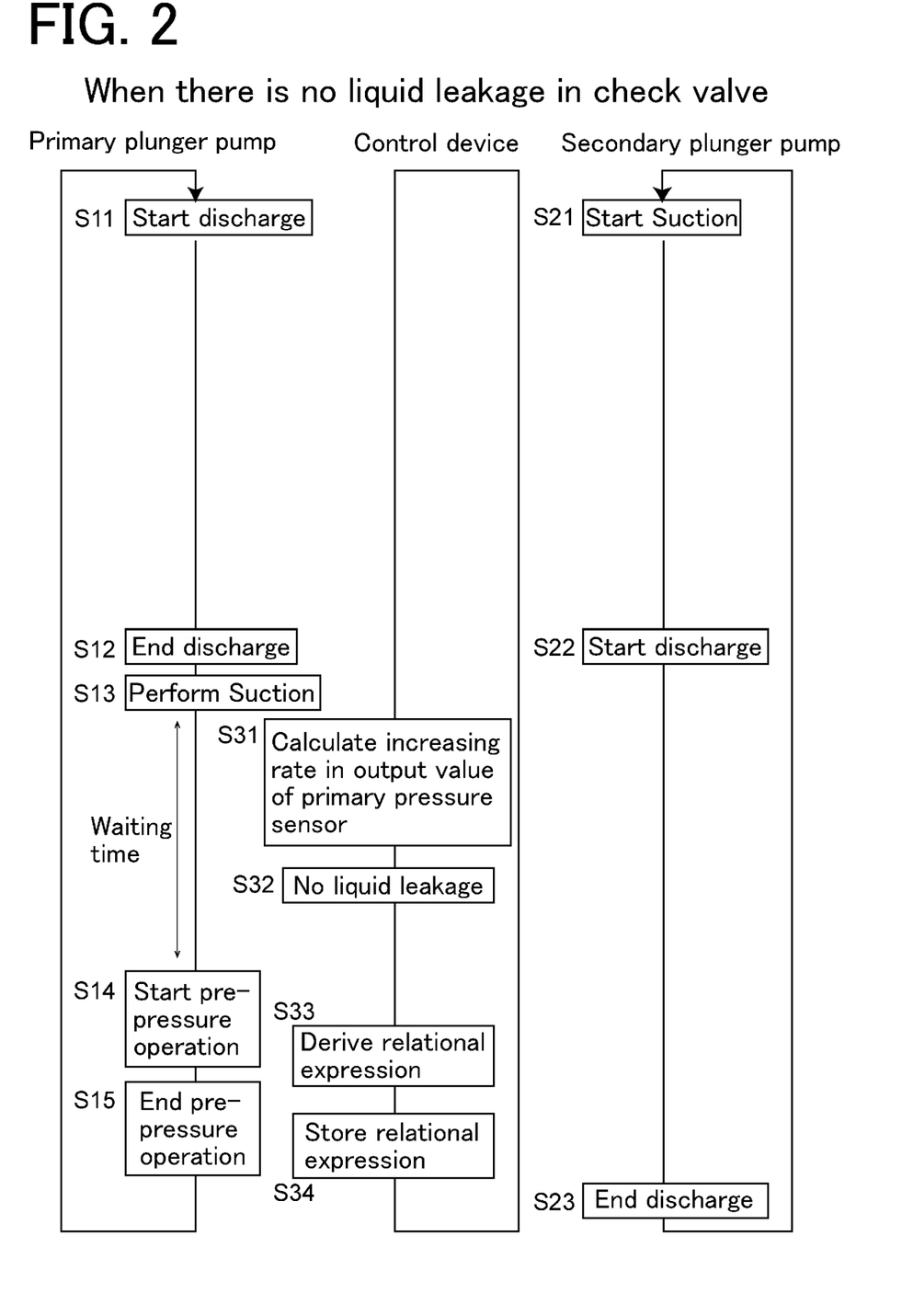
FIG. 2 is a flowchart showing operations of a primary plunger pump, a secondary plunger pump, and a control device during a liquid feeding when liquid leakage does not occur at a check valve of the embodiment.
Figure 3:
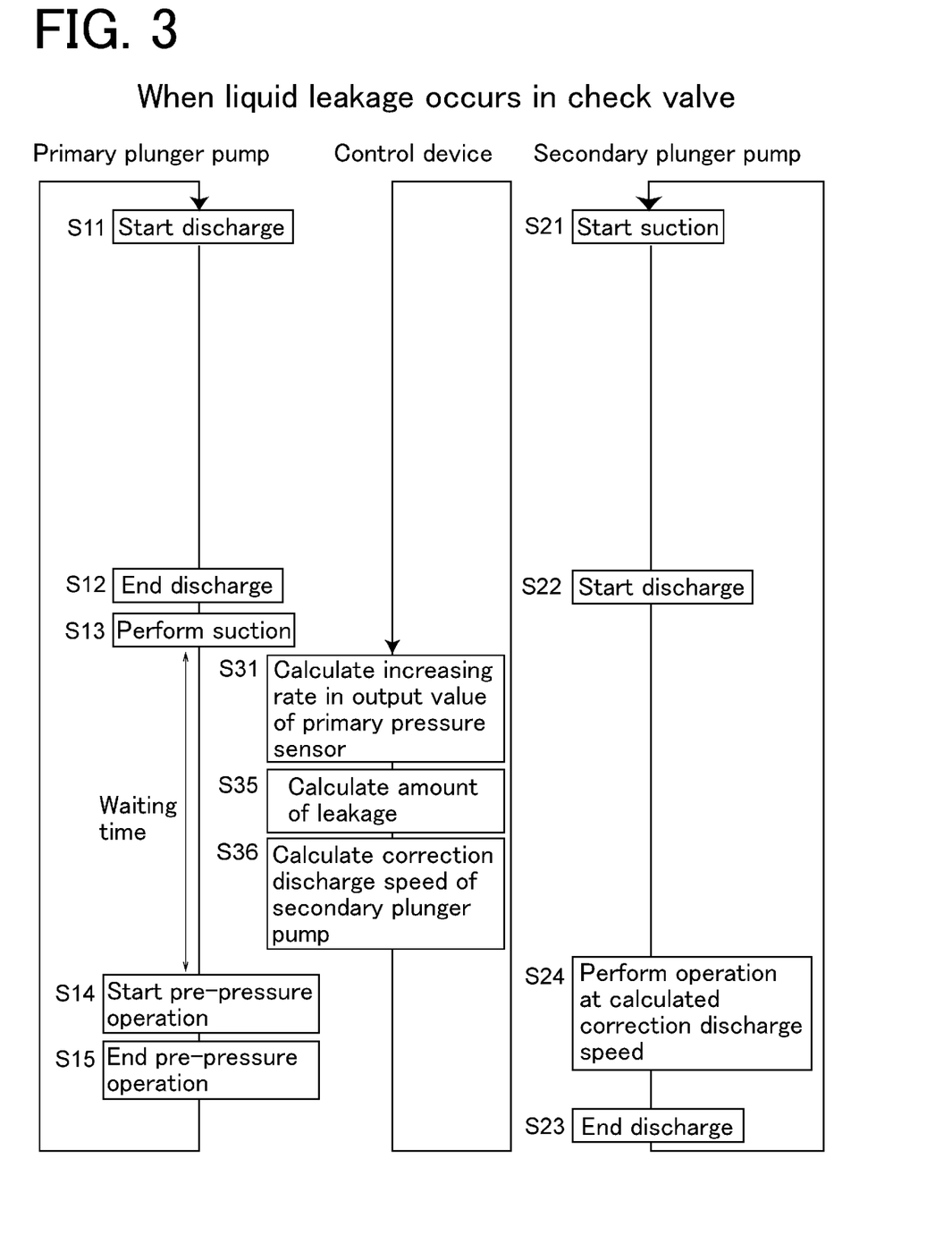
FIG. 3 is a flowchart showing operations of the primary plunger pump, the secondary plunger pump, and the control device during a liquid feeding when liquid leakage occurs at the check valve of the embodiment.

An example of the operations of the primary plunger pump 2, the secondary plunger pump 22, and the control device 42 realized by the above-described parts 44, 46, 48, 50 and 52 are shown in FIGS. 2 and 3. FIG. 2 shows the operation when no liquid leakage occurs in the check valve 26, and FIG. 3 shows the operation when liquid leakage occurs in the check valve 26.

First, with reference to FIG. 2 and FIG. 1, the operation when the liquid leakage occurs in the check valve 26 will be described.

When the primary plunger pump 2 starts the liquid discharge operation (step S11), the liquid feeding control part 44 causes the secondary plunger pump 22 to start the suction operation (step S21). When the primary plunger pump 2 performs the discharge operation, the check valve 16 is closed and the check valve 26 is opened, and the liquid from the outlet portion of the pump head 3 passes through the connection flow path 18, the check valve 26 and the pump chamber 24, and is discharged to the outlet flow path 38. The secondary plunger pump 22 performs a suction operation at a flow rate smaller than the discharge flow rate of the primary plunger pump 2, and part of the liquid discharged from the pump head 3 is stored in the pump chamber 24.

The liquid feeding control part 44 ends the discharge operation of the primary plunger pump 2 at a predetermined timing, and at this time, causes the secondary plunger pump 22 to start the discharge operation (steps S12 and S22). When the discharge operation of the secondary plunger pump 22 is started, the check valve 26 is closed by the pressure in the pump chamber 24 becoming higher than the pressure in the pump chamber 4.

After starting the discharge operation of the secondary plunger pump 22, the liquid feeding control part 44 causes the primary plunger pump 2 to perform a suction operation at a high speed (step S13), and then waits for a certain period of time. After the primary plunger pump 2 finishes the suction operation, the time for which the primary plunger pump 2 waits without operating is referred to as the "waiting time". During this waiting time, the liquid leakage detector 46 monitors an output value P1 of the primary pressure sensor 20 and calculates the increasing rate (step S31). When the check valve 26 does not leak, the pressure in the pump chamber 4 of the primary plunger pump 2 does not vary and is maintained at atmospheric pressure, so that the increasing rate in the output value P1 of the primary pressure sensor 20 is substantially equal to zero. In this case, the liquid leakage detector 46 determines that there is no liquid leakage at the check valve 26 (step S32).

Note that the fact that the increasing rate in the output value P1 is "substantially equal to zero", includes a value that is considered to be equivalent to zero in consideration of noise and the like in the output signal of the primary pressure sensor 20 even though it is not completely zero. Whether the increase rate of the output value P1 is "substantially equal to zero" can be determined, for example, by whether the increasing rate in the output value P1 obtained by calculation exceeds a preset threshold value.

The pre-pressure operation part 48 causes the primary plunger pump 2 to perform a pre-pressure operation after the predetermined waiting time has elapsed and before the discharge operation of the secondary plunger pump 22 is completed (steps S14 and S15). The pre-pressure operation means an operation in which the pressure in the pump chamber 4 of the primary plunger pump 2 is set to the same pressure as the pressure in the pump chamber 24 of the secondary plunger pump 22 before the discharge operation of the secondary plunger pump 22 is completed. In this pre-pressure operation, the primary plunger pump 2 is driven to discharge the liquid while the feedback control is performed so that the pre-pressure operation part 48 takes in the output value P1 of the primary pressure sensor 20 and the output value P2 of the secondary pressure sensor 40 to make the pressure in the pump chamber 4 substantially the same as the pressure in the pump chamber 24.

During the pre-pressure operation, the relational expression deriving part 52 derives a relational expression between the increasing rate in the output value of the primary pressure sensor 20 and the amount of liquid leakage per part time at the check valve 26 (step S33). By monitoring the output value P1 of the primary pressure sensor 20 during the pre-pressure operation, the amount of increase in the output value P1 of the primary pressure sensor 20 when the plunger 10 of the primary plunger pump 2 is driven in the discharge direction by a certain distance can be determined. Thereby, the characteristic (compression rate) of the liquid currently fed can be investigated.

As an example, it is assumed that the primary plunger pump 2 discharges 1.0 μL of liquid when a stepping motor 12 is rotated by one pulse. In a case where the stepping motor 12 is rotated by one pulse during the pre-pressure operation, when the pressure value detected by the primary pressure sensor 20 increases by 5 MPa, the calculation is performed as follows: 1.0 μL/pulse÷5.0 MPa/pulse=0.2 μL/MPa. That is, when the pressure value P1 detected by the primary pressure sensor 20 increases by 1 MPa, it means that 0.2 μL of liquid has flowed into the primary pressure sensor 20. Therefore, assuming that the amount of liquid leakage at the check valve 26 is X (μL/sec)) and the increasing rate in the output value P1 of the primary pressure sensor 20 is ΔP1 (MPa/sec), the relational expression for obtaining X is as follows: X=0.2×ΔP1. The relational expression thus obtained is stored in the relational expression holding part 50 (step S34).

Thereafter, the liquid feeding control part 44 causes the secondary plunger pump 22 to end the discharge operation of (step S23), and again causes the primary plunger pump 2 to start the discharge operation (step S11).

Next, with reference to FIG. 3 together with FIG. 1, the operation when a liquid leakage occurs at the check valve 26 will be described.

The discharge operation (step S11) of the primary plunger pump 2 and the suction operation (step S22) of the secondary plunger pump 22 are the same as the case where no liquid leakage occurs at the check valve 26.

After starting the discharge operation of the secondary plunger pump 22, the liquid feeding control part 44 causes the primary plunger pump 2 to perform a suction operation at a high speed (step S13), and then waits for a certain period of time. During this waiting time, the liquid leakage detector 46 monitors an output value P1 of the primary pressure sensor 20 and calculates the increasing rate (step S31). When liquid leakage occurs at the check valve 26, the pressure in the pump chamber 4 of the primary plunger pump 2 increases, and the increasing rate increases depending on the amount of leakage per part time in the check valve 26. The liquid leakage detector 46 calculates the amount of leakage per part time at the check valve 26 using the calculated increasing rate and the relational expression held in the relational expression holding part 50 (step S35).

Based on the amount of liquid leakage per part time calculated by the liquid leakage detector 46, the liquid feeding control part 44 calculates the discharge speed (correction discharge speed) of the secondary plunger pump for compensating for the loss of the liquid feeding flow rate caused by the liquid leakage (step S36). For example, when the set value of the liquid feeding flow rate is 100 μL/min, when the amount of liquid leakage at the check valve 26 calculated by the liquid leakage detector 46 is 1 μL/sec (60 μL/min), the discharge flow rate of the secondary plunger pump 22 to compensate for the loss of the liquid feeding flow rate due to the liquid leakage can be calculated as follows: 100 μL/min+60 μL/min=160 μL/min. The liquid feeding control part 44 calculates the discharge speed of the secondary plunger pump 22 so that the liquid having the flow rate calculated as described above is discharged from the secondary plunger pump 22.

The secondary plunger pump 22 operates at the discharge speed calculated by the liquid feeding control part 44 (step S24). As a result, the loss of the liquid feeding flow rate caused by liquid leakage at the check valve 26 is compensated by the increase in the discharge speed of the secondary plunger pump 22, the liquid feeding flow rate is stabilized and the occurrence of pulsation is suppressed.

Figure 4:
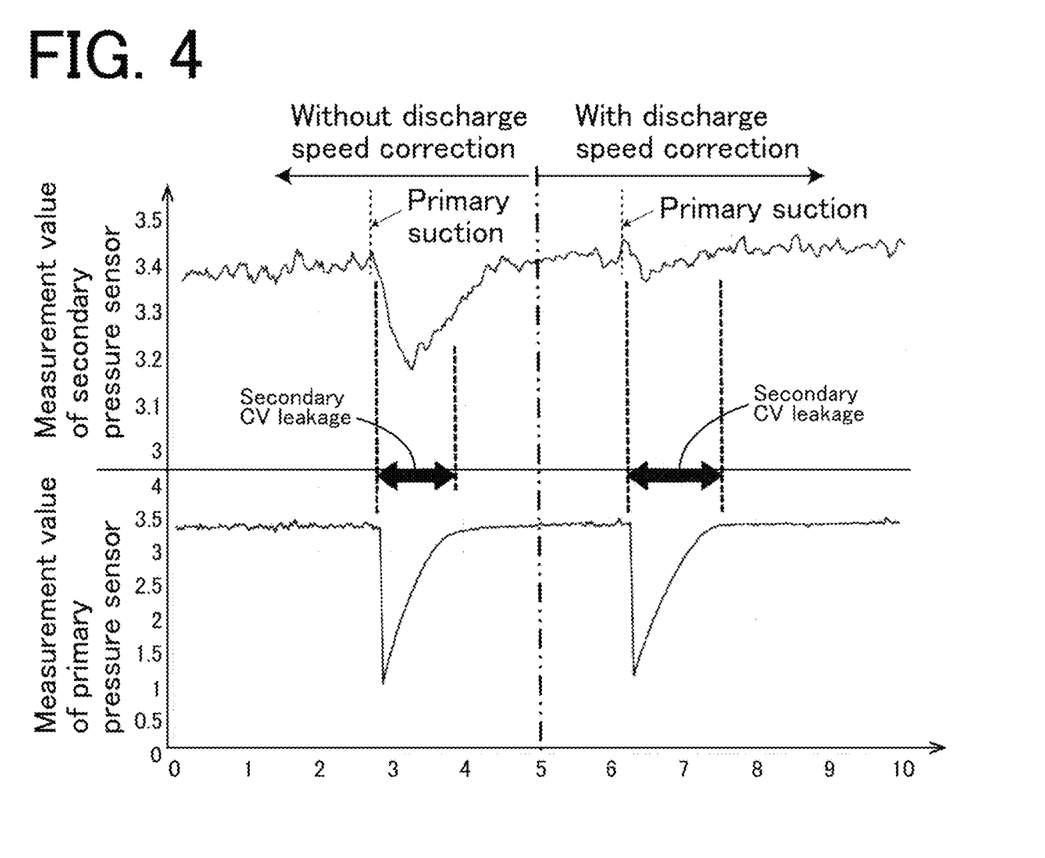
FIG. 4 is a graph showing temporal changes in measured values of a primary pressure sensor and a secondary pressure sensor.

FIG. 4 is verification data on the difference in liquid feeding pressure between when the discharge speed of the secondary plunger pump 22 is not corrected and when it is corrected in a case where a liquid leak occurs in the check valve 26. In this figure, the lower graph represents the time change of the measured value (MPa) of the primary pressure sensor 20, and the upper graph represents the time change of the measured value (MPa) of the secondary pressure sensor 40. In this verification, the discharge speed of the secondary plunger pump 22 is not corrected in the first half of the liquid feeding cycle, and the discharge speed of the secondary plunger pump 22 in the second half of the liquid feeding cycle is corrected to compensate for the loss of the liquid feeding flow rate due to liquid leakage at the check valve 26.

When there is no liquid leakage in the check valve 26 provided between the primary plunger pump 2 and the secondary plunger pump 22, the pressure in the pump chamber 4 of the primary plunger pump 2 should have been maintained at atmospheric pressure during the waiting time after the suction operation of the primary plunger pump 2 (denoted as primary suction) is completed. However, in this verification, it can be seen that liquid leakage occurs in the check valve 26 because the pressure increases immediately after the suction operation of the primary plunger pump 2 is completed.

In the first half of the liquid feeding cycle in which the discharge speed of the secondary plunger pump 22 is not corrected, the liquid feeding pressure (measured value of the secondary pressure sensor 40) is lost due to liquid leakage at the check valve 26, and a pulsation of about 0.22 MPa occurs. In contrast, in the latter half of the liquid feeding cycle in which the discharge speed of the secondary plunger pump 22 is corrected, it can be seen that the pulsation is suppressed to about 0.05 MPa. As a result, it was found that the liquid feeding flow rate was stabilized by correcting the discharge speed of the secondary plunger pump 22 and the effect of suppressing pulsation was obtained.

DESCRIPTION OF REFERENCE SIGNS

1: liquid feeding device
2: Primary plunger pump
3, 23: Pump head
4, 24: Pump chamber
6, 28: Pump body
8, 30: Crosshead
10, 32: Plunger
12, 34: Motor
14, 36: Lead screw
16, 26: Check valve
20: Primary pressure sensor
22: Secondary plunger pump
40: Secondary pressure sensor
42: Control part
44: Flow control part
46: liquid leakage detector
48: Pre-pressure operation part
50: Relational expression holding part
52: Relational expression deriving part

The invention claimed is:

1. A liquid feeding device comprising:
a primary plunger pump;
a secondary plunger pump connected to downstream of the primary plunger pump in series;
a check valve provided between an outlet of the primary plunger pump and an inlet of the secondary plunger pump;
a primary pressure sensor that communicates with a pump chamber of the primary plunger pump and that detects a pressure in the pump chamber of the primary plunger pump;
a liquid feeding control part configured to control suction operations and discharge operations of the primary plunger pump and the secondary plunger pump, wherein the liquid feeding control part is configured to control the operation of the primary plunger pump and the secondary plunger pump to produce a predetermined waiting time immediately after completion of the suction operation of the primary plunger pump, where the primary plunger pump stops without operating and the pressure in the pump chamber of the primary plunger pump is normally atmospheric pressure in an absence of liquid leakage in the check valve during an entire duration of the predetermined waiting time, and a discharge operation by the secondary plunger pump is performed during the predetermined waiting time; and
a liquid leakage detector configured to obtain an output value of the primary pressure sensor during the predetermined waiting time and to detect liquid leakage in the check valve using the obtained output value of the primary pressure sensor.

2. The liquid feeding device according to claim 1, wherein the liquid leakage detector configured to calculate an amount of liquid leakage in the check valve based on the output value of the primary pressure sensor during the predetermined waiting time.

3. The liquid feeding device according to claim 2, further comprising:
a relational expression holding part that holds a relational expression indicating a relationship between an increasing rate in the output value of the primary pressure sensor and the amount of liquid leakage per part time in the check valve, wherein
the liquid leakage detector is configured to calculate the amount of liquid leakage per part time in the check valve based on the increasing rate in the output value of the primary pressure sensor during the predetermined waiting time and the relational expression held in the relational expression holding part.

4. The liquid feeding device according to claim 3, further comprising:
a secondary pressure sensor that communicates with a pump chamber of the secondary plunger pump and detects a pressure in the pump chamber of the secondary plunger pump;
a pre-pressure operation part configured to perform a pre-pressure operation in which a discharge operation of the primary plunger pump is performed until an output value of the primary pressure sensor reaches a value the same as an output value of the secondary pressure sensor while a discharge operation by the secondary plunger pump is performed after the predetermined waiting time has elapsed; and
a relational expression deriving part configured to obtain the relational expression based on a driving amount of a plunger of the primary plunger pump and the increasing rate in the output of the primary pressure sensor while the pre-pressure operation is performed, wherein
the relational expression holding part is configured to hold the relational expression derived by the relational expression deriving part.

5. The liquid feeding device according to claim 2, wherein when liquid leakage is detected in the check valve by the liquid leakage detector, the liquid feeding control part is configured to compensate for a loss of a liquid feeding flow rate due to the liquid leakage by increasing a discharge speed of the secondary plunger pump based on the amount of the liquid leakage calculated by the liquid leakage detector.

6. The liquid feeding device according to claim 1, wherein the liquid feeding control part is configured to control the primary plunger pump and the secondary plunger pump so that cycles each including suction operations and discharge operations of the primary plunger pump and the secondary plunger pump are performed repeatedly, and the predetermined waiting time is produced in each of the cycles.

\* \* \* \* \*